United States Patent
Nakata

(10) Patent No.: US 8,302,867 B2
(45) Date of Patent: Nov. 6, 2012

(54) SYMBOL READING DEVICE, SYMBOL READING METHOD AND PROGRAM RECORDING MEDIUM TO CONTROL FOCUS BASED ON SIZE OF CAPTURED SYMBOL

(75) Inventor: Shinji Nakata, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 302 days.

(21) Appl. No.: 12/710,526

(22) Filed: Feb. 23, 2010

(65) Prior Publication Data
US 2010/0219247 A1 Sep. 2, 2010

(30) Foreign Application Priority Data
Mar. 2, 2009 (JP) ................. 2009-047709

(51) Int. Cl.
*G06K 7/10* (2006.01)
(52) U.S. Cl. .......... 235/462.24; 235/462.09; 235/462.23
(58) Field of Classification Search ............. 235/462.23, 235/462.01, 462.09, 462.24
See application file for complete search history.

(56) References Cited

U.S. PATENT DOCUMENTS

| | | | | |
|---|---|---|---|---|
| 7,562,825 B2 * | 7/2009 | Itou et al. | .................. | 235/462.21 |
| 7,748,629 B2 * | 7/2010 | Brock | ...................... | 235/462.11 |
| 8,083,148 B2 * | 12/2011 | Wang et al. | .............. | 235/472.01 |
| 2009/0108071 A1 * | 4/2009 | Carlson | .................... | 235/462.32 |

FOREIGN PATENT DOCUMENTS

| | | |
|---|---|---|
| JP | 10-134133 A | 5/1998 |
| JP | 11-039420 A | 2/1999 |
| JP | 2000-230806 A | 8/2000 |
| JP | 2002-056348 A | 2/2002 |
| JP | 2003-075717 A | 3/2003 |
| JP | 2005-025417 A | 1/2005 |
| JP | 2005-266223 A | 9/2005 |
| JP | 2006-025055 A | 1/2006 |
| JP | 2008-145782 A | 6/2008 |

OTHER PUBLICATIONS

Japanese Office Action dated Apr. 19, 2011 (and English translation thereof) in counterpart Japanese Application No. 2009-047709.
Japanese Office Action dated Jan. 25, 2011 (and English translation thereof) in counterpart Japanese Application No. 2009-047709.
Japanese Office Action dated Sep. 11, 2012 issued in counterpart Japanese Application No. 2011-065354.

* cited by examiner

*Primary Examiner* — Ahshik Kim
(74) *Attorney, Agent, or Firm* — Holtz, Holtz, Goodman & Chick, PC

(57) ABSTRACT

Disclosed is a symbol reading device including: an imaging section to capture a symbol and generate an image; a detecting section to detect a size of the symbol; a judging section to judge large or small by comparing the size of the symbol to a pre-set value; a focus movement controlling section to move a focus position of the imaging section to a predetermined position of a farther side when the size of the symbol is smaller than the pre-set value as a result of the judgment, and to move a focus position of the imaging section to a predetermined position of a closer side when the size of the symbol is larger than the pre-set value as a result of the judgment; and an analyzing section to analyze symbol data corresponding to the symbol at a focus position moved by the focus movement controlling section.

7 Claims, 8 Drawing Sheets

SYMBOL READING DEVICE, SYMBOL READING METHOD AND PROGRAM RECORDING MEDIUM TO CONTROL FOCUS BASED ON SIZE OF CAPTURED SYMBOL

CROSS-REFERENCE TO RELATED APPLICATIONS

This application is based upon and claims the benefit of priority from the prior Japanese Patent Application No. 2009-047709 filed Mar. 2, 2009, the entire contents of which are incorporated herein by reference.

BACKGROUND OF THE INVENTION

1. Field of the Invention

The present invention relates to a symbol reading device, symbol reading method and program recording medium to read a symbol of a barcode or two dimensional code where focus is controlled based on size of a captured symbol.

2. Description of the Related Art

Symbols are widely used to identify various pieces of information. A barcode is a symbol representing numeric value information according to specification by one dimensional graphic representation. Lately, a symbol called two dimensional code which holds information in both vertical and horizontal directions is becoming widespread.

A symbol reading device such as a "handy terminal" (portable terminal for commercial use) images an object including a symbol with an imaging device such as a camera and by analyzing the imaged image with a decoding engine, the symbol reading device reads contents of the symbol.

When a symbol such as a barcode or two dimensional code is imaged by a symbol reading device including an imaging device such as a digital camera to extract an ID, it is difficult to find a suitable composition or distance to capture the symbol.

Conventionally, in a digital camera including a seamless focus adjustment function, as a method for selecting the most suitable focus position for capturing an object such as a barcode, the following methods could be used. For example, there is a method of directly measuring a distance to the object with a ranging sensor which uses PSD (Position Sensitive Detector) or by a phase difference method which uses a pair of linear image sensors or measuring a distance by a ranging method using laser irradiation and directly moving the lens to the focus position according to the value.

Since the above described method consumes only about an instant to determine the best focus, a good response can be provided to the user and there is also a merit of high accuracy. On the other hand, a ranging device (sensor) separate from a camera module is necessary, and thus there is the demerit that the cost increases and the size becomes large. Therefore, such method is often used in a single lens reflex camera where there is relatively allowance for cost and size.

Also, other than the method described above, there is a contrast method as a method often used in compact digital cameras, etc.

The contrast method is a method in which images are sequentially captured while moving the focus position from the farthest point to the closest point to find the focus position where the contrast of the captured image is judged to be highest. This method uses the operation of sequentially capturing images while moving the focus position and thus there is a demerit that the method is time consuming.

For example, Japanese Patent Application Laid-Open Publication No. 2006-25055 discloses a technique where an imaging condition setting section is provided to set the imaging condition corresponding to normal photography and barcode capturing and when the barcode is captured, a suitable imaging condition is set as the imaging condition for barcode capturing with the barcode image fitted in the frame for alignment.

BRIEF SUMMARY OF THE INVENTION

The present invention has been made in consideration of the above situation, and one of the main objects is to provide a symbol reading device, symbol reading method and recording medium where a user can extract an ID of a symbol with high speed by only positioning a symbol within a display screen of a symbol reading device and capturing the symbol.

In order to achieve any one of the above objects, according to an aspect of the present invention, there is provided a symbol reading device including:

an imaging section to capture a symbol and generate an image;

a detecting section to detect a size of the symbol from the captured image generated by the imaging section;

a judging section to judge large or small by comparing the size of the symbol detected by the detecting section to a pre-set value;

a focus movement controlling section to move a focus position of the imaging section to a predetermined position of a farther side when the size of the symbol is smaller than the pre-set value as a result of the judgment by the judging section, and to move a focus position of the imaging section to a predetermined position of a closer side when the size of the symbol is larger than the pre-set value as a result of the judgment by the judging section; and an analyzing section to analyze symbol data corresponding to the symbol from the captured image captured by the imaging section at a focus position moved by the focus movement controlling section.

According to another aspect of the present invention, there is provided a recording medium storing a program readable by a computer of a symbol reading device, to allow the computer to read the program to perform the following process including the steps of:

detecting a size of a symbol from the captured image generated by a symbol captured by an imaging section;

judging large or small by comparing the size of the detected symbol to a pre-set value;

controlling to move a focus position of the imaging section to a predetermined position of a farther side when the size of the symbol is smaller than the pre-set value as a result of the judgment, and to move a focus position of the imaging section to a predetermined position of a closer side when the size of the symbol is larger than the pre-set value as a result of the judgment; and analyzing symbol data corresponding to the symbol from the captured image captured by the imaging section at a focus position moved by controlling movement.

According to another aspect of the present invention, there is provided a symbol reading method performed by a computer of a symbol reading device, to allow the computer to perform the following process including the steps of:

detecting a size of a symbol from the captured image generated by a symbol captured by an imaging section;

judging large or small by comparing the size of the detected symbol to a pre-set value;

controlling to move a focus position of the imaging section to a predetermined position of a farther side when the size of the symbol is smaller than the pre-set value as a result of the judgment, and to move a focus position of the imaging section to a predetermined position of a closer side when the size of the symbol is larger than the pre-set value as a result of the judgment; and analyzing symbol data corresponding to the symbol from the captured image captured by the imaging section at a focus position moved by controlling movement.

According to the above aspects of the present invention, a symbol reading device, symbol reading method and recording medium can be provided, where a user can extract an ID of a symbol with high speed by only positioning a symbol within a display screen of a symbol reading device and capturing the symbol.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention and wherein.

DETAILED DESCRIPTION OF THE INVENTION

An embodiment of the present invention will be described with reference to the drawings.

Figure 1:
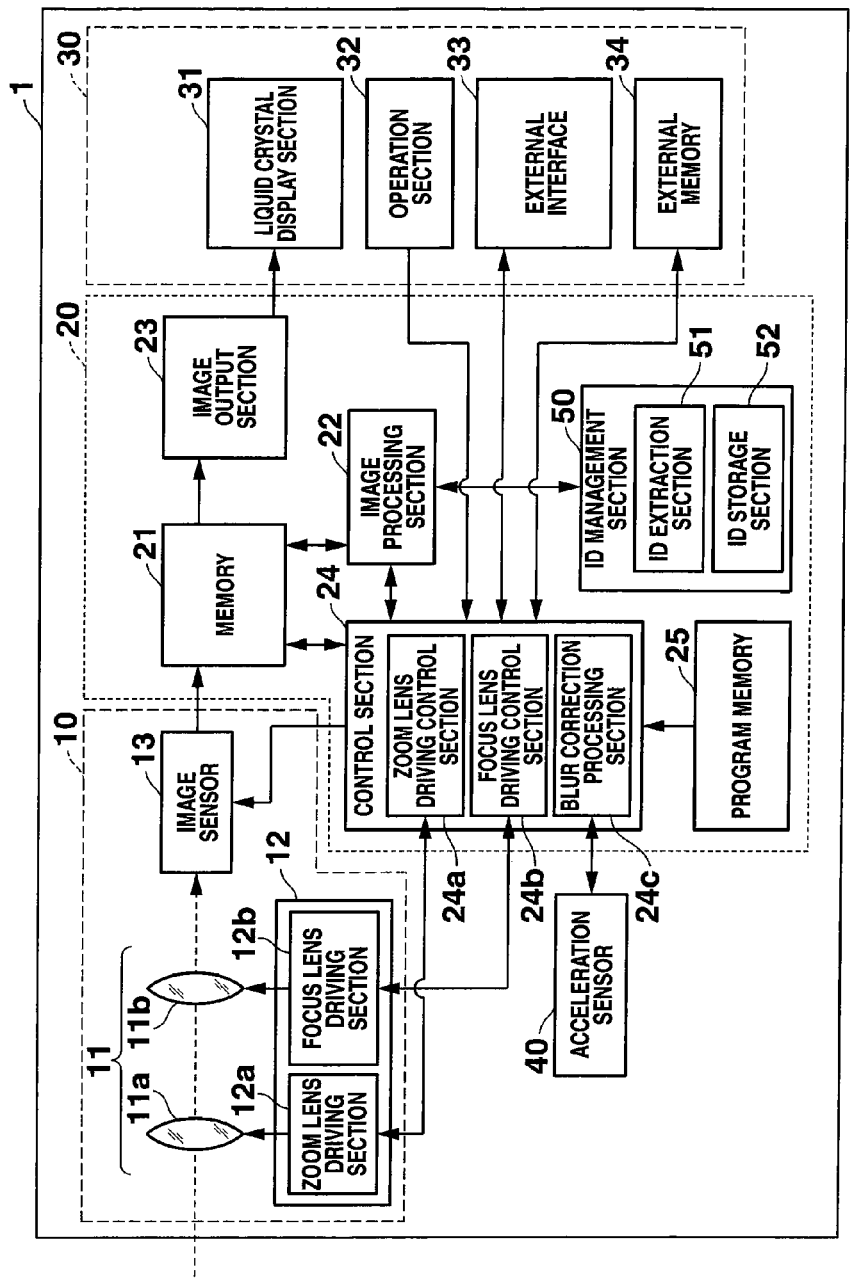
FIG. 1 is a block diagram showing a schematic configuration of a symbol reading device 1 of the present embodiment.

FIG. 1 is a block diagram showing a schematic configuration of the symbol reading device 1 of the present embodiment.

As shown in FIG. 1, the symbol reading device 1 includes an imaging section 10, data processing section 20, user interface section 30 and acceleration sensor 40.

The imaging section 10 includes an imaging lens section 11, lens driving section 12 and image sensor 13, and includes a function of capturing an object.

The imaging lens section 11, for example, includes a plurality of lenses to gather light in order to capture an object and includes a zoom lens 11a to adjust magnification and a focus lens 11b to adjust focus, and the like.

The lens driving section 12 includes a zoom lens driving section 12a to move the zoom lens 11a in an optical axis direction when capturing the object, focus lens driving section 12b to move the focus lens 11b in the optical axis direction when capturing the object, and the like. The zoom lens driving section 12a and the focus lens driving section 12b each include an encoder and rotation amount of each motor can be detected.

The image sensor 13, for example, includes a solid imaging element such as CCD (Charge Coupled Device), CMOS (Complementary Metal Oxide Semiconductor), etc., and imports an image formed in the imaging lens section 11 by gathering light and imports the image as digitalized image data. The imported image data is temporarily stored in a memory 21 of the data processing section 20.

The data processing section 20 includes a memory 21, image processing section 22, image output section 23, control section 24 and program memory 25.

The memory 21 temporarily stores image data (for example, barcode image, etc.) imported by the image sensor 13 each time capturing processing is performed. Also, the memory 21 stores image data, values of various flags, thresholds, etc. necessary for image processing. Further, the memory 21 includes a display memory area for performing storage and read out of display image data to perform image display.

The image processing section 22 performs predetermined image processing on image data temporarily stored in the memory 21 in order to perform image display. After the image processing is performed on the image data, the image data is stored in the display memory area of the memory 21 as display image data.

The image output section 23 reads out display image data stored in the display memory area of the memory 21 and generates an RGB signal based on the read out display image data and outputs the generated RGB signal to a liquid crystal display section 31 of the user interface section 30. Also, the RGB signal is externally output through an external interface 33 of the user interface section 30 so that an image can be displayed by an external device such as a television, PC, projector or the like.

The control section 24 internally includes a CPU (computer), RAM, etc., and also includes a zoom lens driving control section 24a, focus lens driving control section 24b and blur correction processing section 24c. The CPU (computer) performs processes of various control operations according to a program for the symbol reading device 1 stored in the program memory 25.

The zoom lens driving control section 24a calculates and holds in advance the number of pulses (driving amount) necessary to drive the zoom lens 11a with the DC motor and controls driving of the zoom lens 11a according to the driving amount.

The focus lens driving control section 24b controls the position of the focus lens 11b according to an evaluated value of the focus accuracy of the image formed by the imaging lens section 11 such as contrast value or edge amount. Also, the focus lens driving control section 24b calculates a focus following position based on the calculated driving amount and drives the focus lens 11b to the focus following position.

The blur correction processing section 24c drives a blur correction lens (not shown) of the imaging lens section 11 in a direction orthogonal to the optical axis according to the blur amount of the symbol reading device 1 input from a later described acceleration sensor 40 and controls correction of the blur of the image formed in the image sensor 13.

Also, the control section 24 detects the size of the two dimensional code from the captured image generated by the imaging section 10 and compares the size of the detected two dimensional code with a value set in advance to judge which is larger or smaller. As a result of the judgment, if the size of the two dimensional code is smaller than the pre-set value, the focus position of the focus lens 11b is moved to a predetermined position of the farther side and when the size of the two dimensional code is larger than the pre-set value, the focus position of the focus lens 11b is moved to a predetermined position of the closer side. Then, the symbol data corresponding to the two dimensional code is analyzed with the generated captured image.

The program memory 25 includes a storage device such as a ROM (Read Only Memory) or Flash Memory and includes a storage medium to store various programs and pieces of data necessary to operate the control section 24. Specifically, a two dimensional code reading program, which analyzes the two dimensional code to obtain information, and the like are stored in the storage medium.

The user interface section 30 includes a liquid crystal display section 31, operation section 32, external interface section 33 and external memory 34.

The liquid crystal display section 31 displays an object image based on an RGB signal output from the image output section 23. Specifically, the liquid crystal display section 31 displays a live preview image based on a plurality of pieces of image data generated by the imaging section 10 and moving images stored in the external memory 34 while recording and plays moving images stored in the external memory 34. The liquid crystal display section 31 can include an image memory (not shown) to temporarily store display image data output as necessary from the image output section 23.

The operation section 32 is a function for a user to perform predetermined operation of the symbol reading device 1 and the operation section 32 outputs an operation signal according to the user operation to the control section 24. The operation section 32 includes for example a shutter button, selection enter button, play button, capture button, mode switching button and the like. The mode switching button is a button used to switch between a moving image capturing mode for taking moving images and a still image capturing mode for taking still images.

The external interface 33 is a connection terminal to connect with external devices such as a television, PC, projector or the like, and the external interface 33 performs sending and receiving of data through a predetermined communication cable.

The external memory 34 includes, for example, a card shaped nonvolatile memory (flash memory), hard disk or the like and the external memory 34 stores a plurality of pieces of image data of object images taken by the imaging section 10 and compressed and encoded by the image processing section 22.

The acceleration sensor 40 physically and directly detects movement of the symbol reading device 1 and inputs a measurement value which shows the angular velocity to the control section 24.

The ID management section 50 includes an ID extraction section 51 and an ID storage section 52. The ID extraction section 51 extracts an ID from a barcode image stored in the memory 21 based on an instruction from the control section 24. The extracted ID is stored in the ID storage section 52.

Below, the operation of the digital camera 1 is described with reference to FIG. 2A to FIG. 8.

FIG. 2A to FIG. 2F are diagrams showing how focus is adjusted when a two dimensional code is captured. A two dimensional code is a code with a display system including information in a horizontal direction and vertical direction such as a QR code. For example, in three corners of a QR code, there is a design (eye) composed of a black square outer frame, a white square frame inside the black square outer frame and a black square inside the white square frame. Hereinafter, the image of the captured two dimensional code is called the symbol image. When the symbol image is captured, the focus lens 11b is to be in the default position (F0).

Figure 2A:
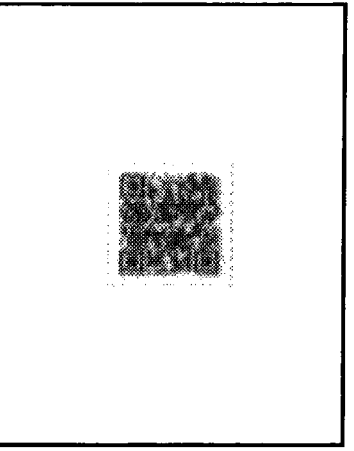
FIG. 2A to FIG. 2F are diagrams showing how focus is adjusted when a two dimensional code is captured.
Figure 2B:
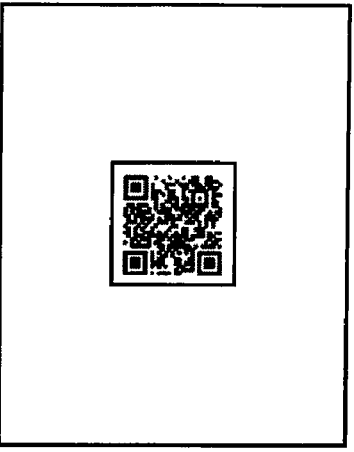

FIG. 2A shows a live preview image when a symbol image is captured from a far point. In the present embodiment, "far" is defined to be a distance of 15 cm from the imaging section 10 of the symbol reading device 1. When the image is captured from a "far" point, a slightly small symbol image is displayed on the screen of the liquid crystal display section 31 in a state out of focus as shown in FIG. 2A. In order to resolve the unfocused state, the focus lens 11b moved to the farther side (F+) is shown in FIG. 2B.

Figure 2C:
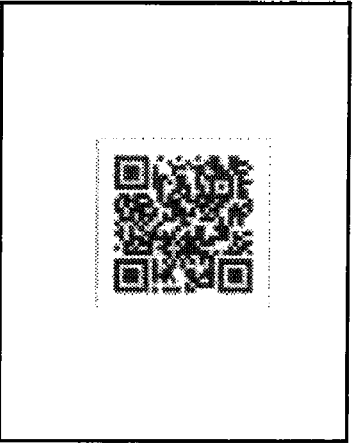
Figure 2D:
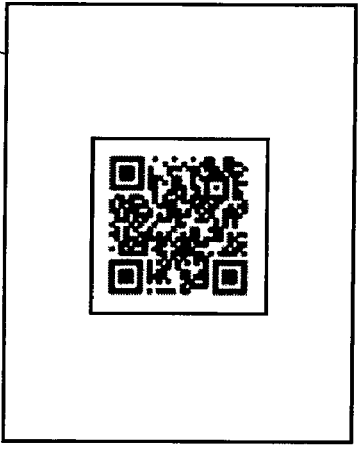

FIG. 2C shows a live preview image when the symbol image is captured in a focused state. In the present embodiment, a distance (=focus position) where focus is performed smoothly when the focus lens 11b is in the default position (F0) is to be 10 cm from the imaging section 10 of the symbol reading device 1. When capturing is performed in a focused state, a focused symbol image is displayed on the screen of the liquid crystal display section 31 as shown in FIG. 2D.

Figure 2E:
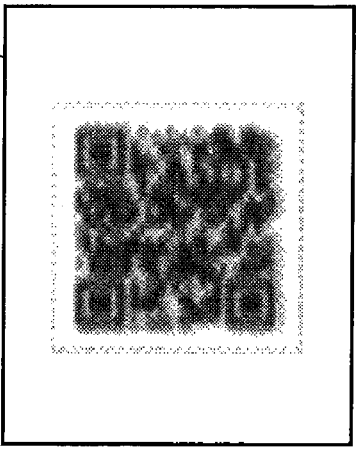
Figure 2F:
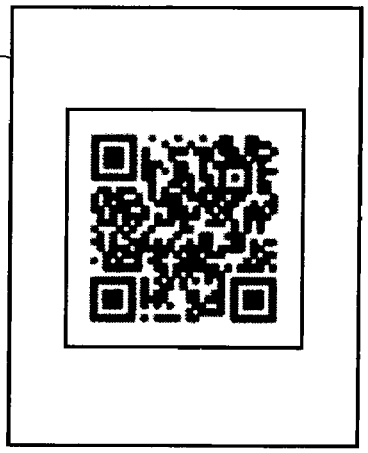

FIG. 2E shows a live preview image when the symbol image is captured from a close point. In the present embodiment, "close" is defined to be a distance of 5 cm from the imaging section 10 of the symbol reading device 1. When the image is captured from a "close" point, a slightly large symbol image is displayed on the screen of the liquid crystal display section 31 in a state out of focus as shown in FIG. 2E. In order to resolve the unfocused state, the focus lens 11b moved to the closer side (F−) is shown in FIG. 2F.

As described above, in the symbol reading device 1 of the present embodiment, the state of the focus is judged by judging the approximate size of the symbol image and the position of the focus lens 11b is moved to the front and back.

Figure 3:
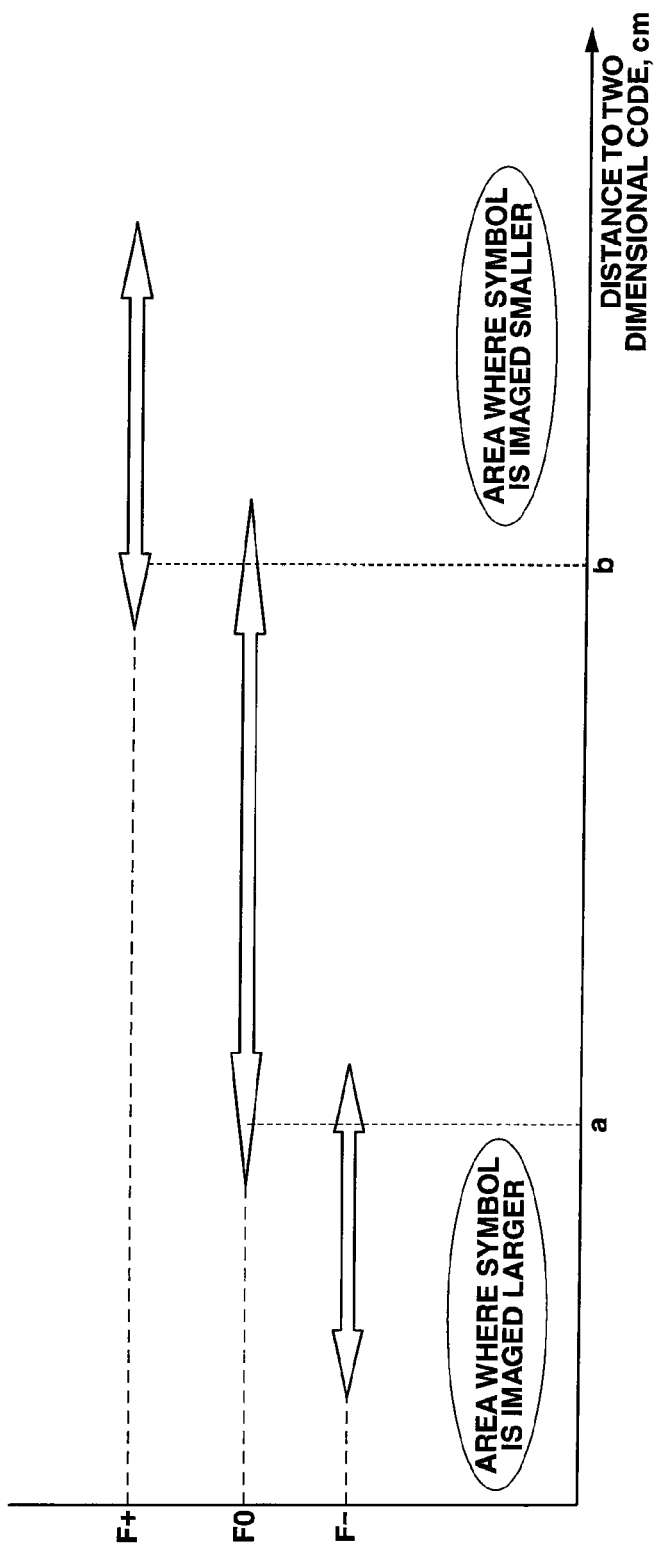
FIG. 3 is a diagram showing a relation between distance from an imaging section 10 of the symbol reading device 1 to the two dimensional code which is an object of imaging and a lens position of a focus lens 11b.

FIG. 3 is a diagram showing a relation between a distance from the imaging section 10 of the symbol reading device 1 to the two dimensional code which is the object and a lens position of the focus lens 11b.

For example, when the distance from the imaging section 10 of the symbol reading device 1 to the two dimensional code is close, the symbol image is focused in an area where the symbol image is imaged larger. In other words, the reading can be successfully achieved when the focus lens 11b is on the closer side (F−).

Also, when the distance from the imaging section 10 of the symbol reading device 1 to the two dimensional code is near the focus position, the symbol image can be focused without moving the focus lens 11b from the default position (F0). In the present embodiment, by performing image analysis processing, the image being slightly unfocused is allowable. Therefore, decoding can be successfully achieved in a relatively wide range.

Also, when the distance from the imaging section 10 of the symbol reading device 1 to the two dimensional code is far, the symbol image is focused in an area where the symbol image is imaged smaller. In other words, the reading can be successfully achieved when the focus lens 11b is on the farther side (F+).

(First Embodiment)

Figure 4:
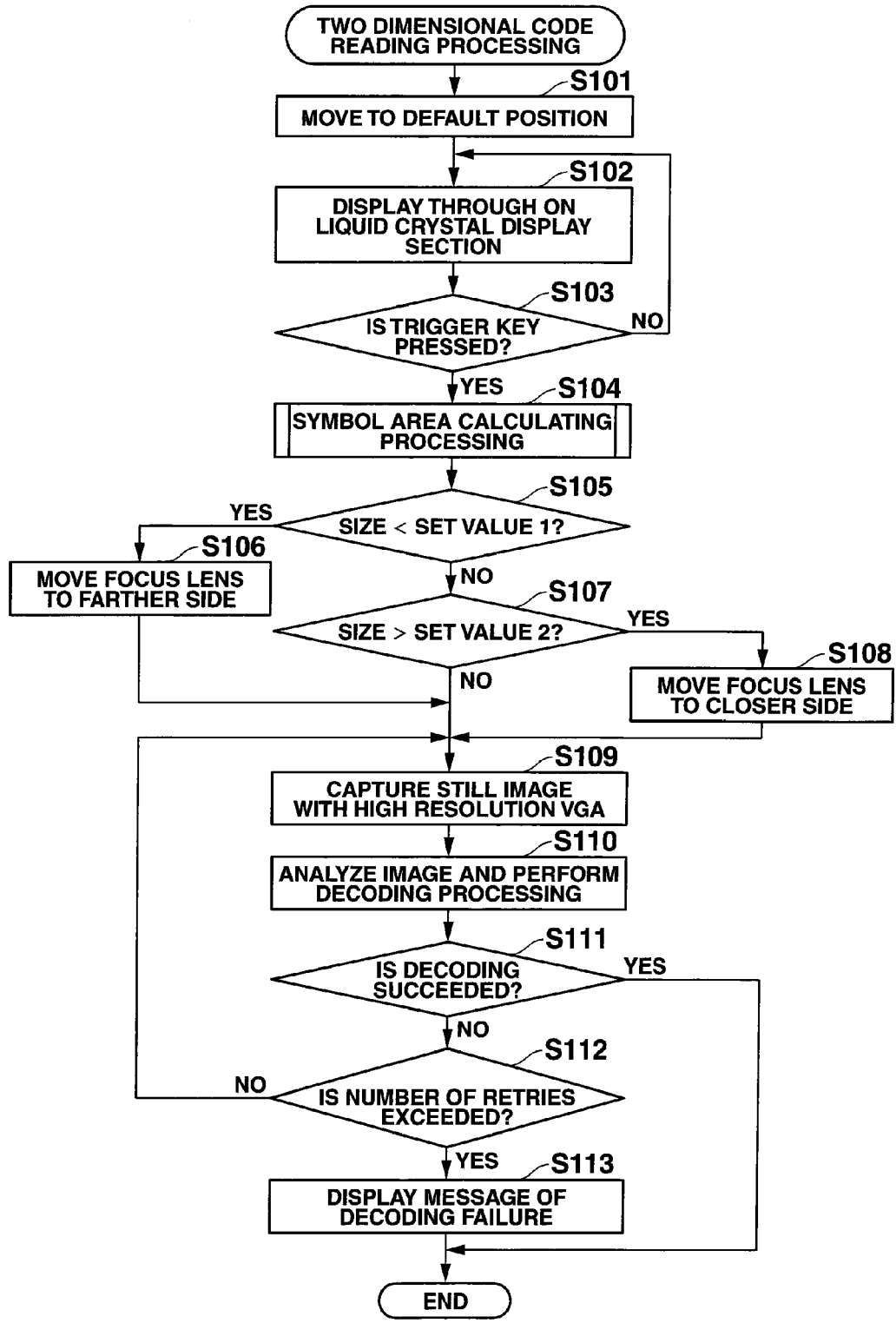
FIG. 4 is a flowchart showing an example of a two dimensional code reading processing performed in the symbol reading device 1 of the present embodiment.

FIG. 4 is a flowchart showing an example of two dimensional code reading processing performed in the symbol reading device 1 of the present embodiment. This two dimensional code reading processing is realized by the control section 24 performing the two dimensional code reading program stored in the program memory 25.

As shown in FIG. 4, in step S101, the position of the focus lens 11b is moved to the default position (F0).

In step S102, the symbol image being imaged by the imaging section 10 is displayed through on the liquid crystal display section 31.

In step S103, it is judged whether or not the capture button of the operation section 32 has been pressed or not by the user. When the capture button is pressed, the processing advances to the next step S104 and when the capture button is not pressed, the processing advances to step S102.

In step S104, the symbol area calculating processing is performed. The symbol area calculating processing is specifically described with reference to FIG. 5 and FIG. 6A to FIG. 6D.

Figure 5:
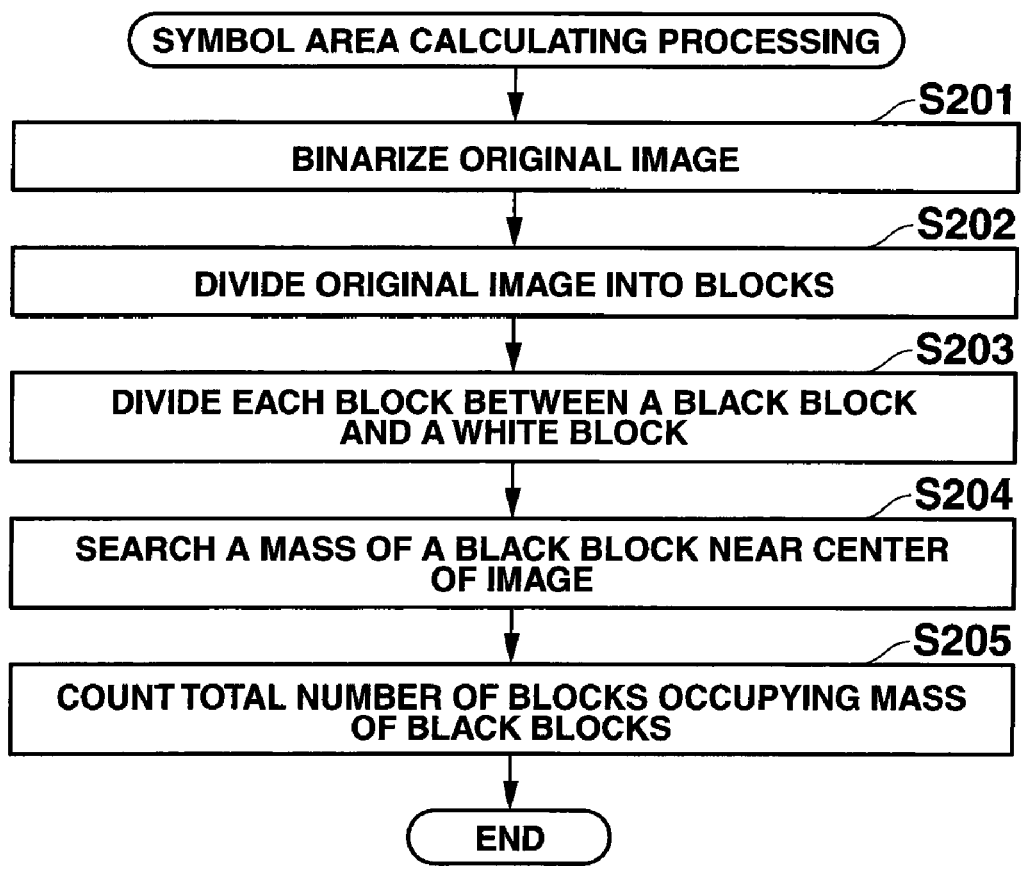
FIG. 5 is a flowchart showing an example of a symbol area calculating processing.

FIG. 5 is a flowchart showing an example of the symbol area calculating processing. Also, FIG. 6A to FIG. 6D are diagrams showing each scene during symbol area calculation processing.

Figure 6A:
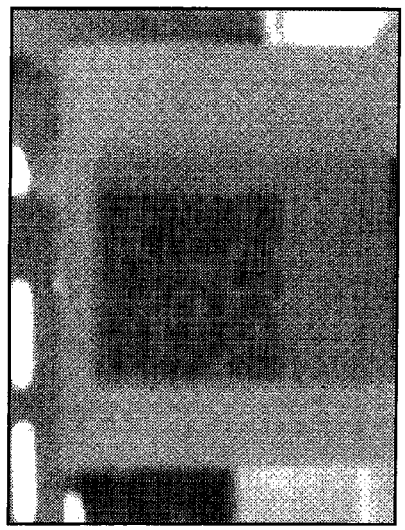
FIG. 6A to FIG. 6D are diagrams showing each scene during symbol area calculating processing.
Figure 6B:
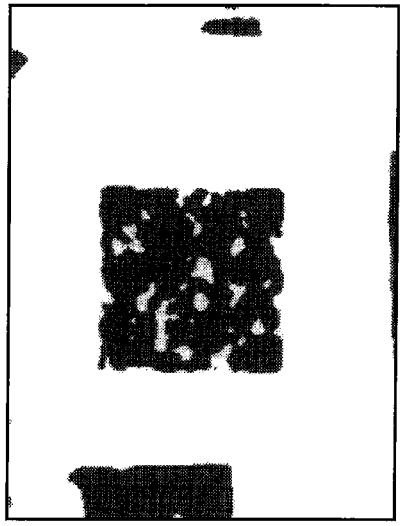

As shown in FIG. 5, in step S201, the original image (see FIG. 6A) displayed through in step S102 shown in FIG. 4 is binarized (see FIG. 6B).

Figure 6C:
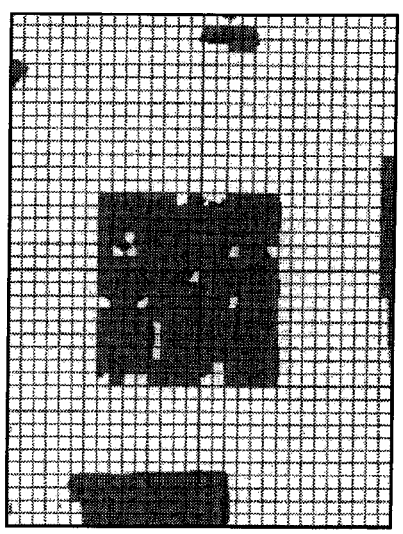

In step S202, the original image binarized in step S201 is divided into blocks (see FIG. 6C). For example, a QVGA (320×240) image is divided into 40×30 blocks in a unit of 8 pixels. A suitable unit of pixels is set in advance by evaluation experiment.

In step S203, each block divided in step S202 is divided into a black block and a white block. The set value to determine a black block is calculated in advance by evaluation experiment. The set value can be changed later to adapt to the actual environment.

Figure 6D:
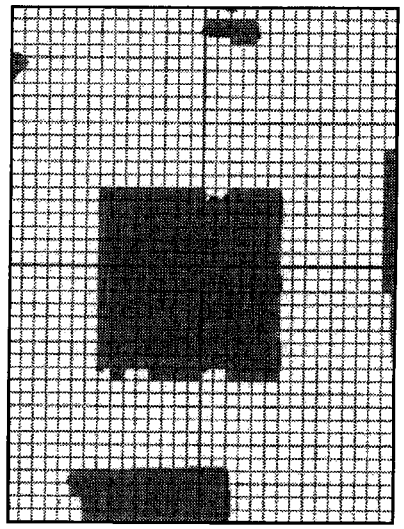

In step S204, the mass of the black block near the center of the original image is searched (see FIG. 6D). Specifically, the mass block is extracted by performing labeling processing on the original image.

In step S205, the total number of blocks occupying the mass of the black block is counted.

Next, in step S105 shown in FIG. 4, it is judged whether or not the size is smaller than the set value 1. The set value 1 is the value b shown in FIG. 3, in other words, the boundary point between the range which can be captured by the default position (F0) and the range which can be captured by the farther side (F+). When the size is smaller than the set value 1, the processing advances to the next step S106, and when the size is the set value 1 or larger, the processing advances to step S107.

In step S106, the focus lens 11b is moved to the farther side (F+).

In step S107, it is judged whether or not the size is larger than the set value 2. The set value 2 is the value a shown in FIG. 3, in other words, the boundary point between the range which can be captured by the default position (F0) and the range which can be captured by the closer side (F−). When the size is larger than the set value 2, the processing advances to the next step S108 and when the size is the set value 2 or smaller, the processing advances to step S109.

In step S108, the focus lens 11b is moved to the closer side (F−).

In step S109, a high resolution VGA captures a still image in the imaging section 10.

In step S110, the still image captured in step S109 is analyzed and decoding processing is performed.

In step S111, it is judged whether or not the decoding of the still image succeeded or not. When the decoding succeeds, the two dimensional code reading processing ends and when the decoding does not succeed, the processing advances to the next step S112.

In step S112, it is judged whether or not the number of retries of the decoding processing is exceeded or not. The number of retries can be set freely by the user. When the number of retries is exceeded, the processing advances to the next step S113 and when the processing is not exceeded, the processing advances to step S109.

In step S113, a message showing the decoding has failed is displayed on the liquid crystal display section 31. When this message is displayed, the two dimensional code reading processing ends.

As described above, in the first embodiment, an approximate size (the area occupying the captured image) of the two dimensional code is judged from the captured image and when the size is smaller than the smaller value of the values set in advance, the position of the focus lens 11b is moved to the predetermined position of the farther side and when the size is larger than the larger value of the values set in advance, the position of the focus lens 11b is moved to the predetermined position of the closer side. Also, when neither case applies, the capturing operation is performed again with the position of the focus lens 11b as is, and the image is analyzed and the decoding processing is performed.

In other words, instead of judging each image one by one while moving the focus adjustment mechanism one step at a time (repeating a cycle of "image capture→image determination→focus movement" a plurality of times) in order to move to a more desirable focus position, the focus position is moved in one step to a predetermined position set in advance and excess capturing time and image determination time will not be necessary. Also, power consumption necessary for such excess operation will not be necessary. Therefore, both a good response and reduction of power consumption can be achieved.

Such technique is especially effective in a camera module such as a liquid lens where the focus movement is much faster than the capturing time of each frame.

(Second Embodiment)

Figure 7:
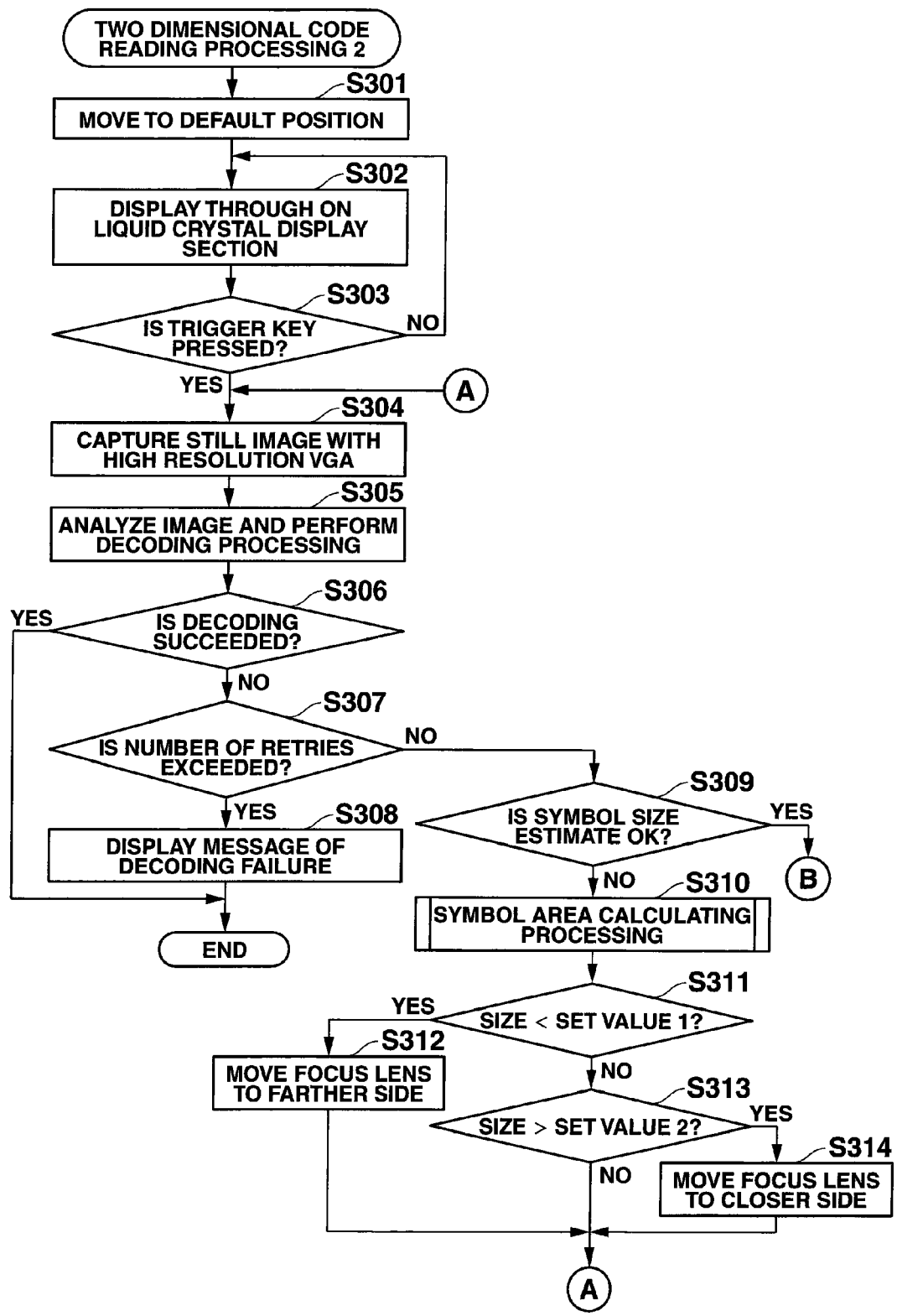
FIG. 7 is a flowchart showing another example of a two dimensional reading processing performed in the symbol reading device 1 of the present embodiment.
Figure 8:
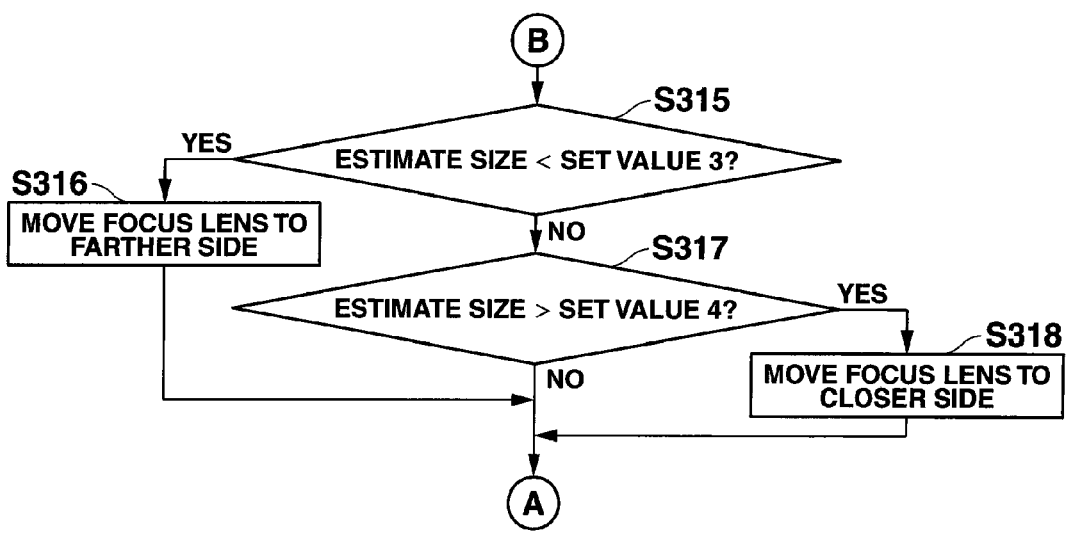
FIG. 8 is a flowchart showing another example of a two dimensional reading processing performed in the symbol reading device 1 of the present embodiment.

FIG. 7 and FIG. 8 are flowcharts showing another example of two dimensional code reading processing (two dimensional code reading processing 2) performed in the symbol reading device 1 of the present embodiment.

As shown in FIG. 7, in step S301, the position of the focus lens 11b is moved to the default position (F0).

In step S302, the symbol image imaged by the imaging section 10 is displayed through on the liquid crystal display section 31.

In step S303, it is judged whether or not the user pressed the capture button of the operation section 32. When the capture button is pressed, the processing advances to the next step S304 and when the capture button is not pressed, the processing advances to step S302.

In step S304, a high resolution VGA captures a still image in the imaging section 10.

In step S305, the still image captured in step S304 is analyzed and the decoding processing is performed.

In step S306, it is judged whether or not the decoding of the still image succeeded or not. When the decoding succeeds, the two dimensional code reading processing ends and when the decoding does not succeed, the processing advances to the next step S307.

In step S307, it is judged whether or not the number of retries of the decoding processing is exceeded or not. The number of retries can be set freely by the user. When the number of retries is exceeded, the processing advances to the next step S308 and when the number of retries is not exceeded, the processing advances to step S309.

In step S308, a message showing that the decoding failed is displayed on the liquid crystal display section 31. When the message is displayed, the two dimensional code reading processing ends.

In step S309, it is judged whether or not the symbol size can be estimated. The symbol size is the size of the symbol image. The estimate of the symbol size is performed based on the portion (eye portion of the two dimensional code) showing the coordinate position included in the captured image. The eye is a design positioned in three corners of a QR code, and each eye is composed of a black square outer frame, a white square frame inside the black square outer frame and a black square inside the white square frame. The eye is defined so that the ratio of the width of the black portions and white portions along a line crossing the center of the eye is to be "1:1:3:1:1". When the size of the symbol size can be estimated by the relation of the position of the three eyes, the processing advances to step S315 shown in FIG. 8 and when the symbol size cannot be estimated, the processing advances to the next step S310.

In step S310, the symbol area calculating processing is performed. The symbol area calculating processing is described specifically above with reference to FIG. 5 and FIG. 6A to FIG. 6D, and thus the description is omitted here.

In step S311, it is judged whether or not the size is smaller than the set value 1. The set value 1 is the value b shown in FIG. 3, in other words, the boundary point between the range which can be captured by the default position (F0) and the range which can be captured by the farther side (F+). When the size is smaller than the set value 1, the processing advances to the next step S312, and when the size is the set value 1 or larger, the processing advances to step S313.

In step S312, the focus lens 11b is moved to the farther side (F+).

In step S313, it is judged whether or not the size is larger than the set value 2. The set value 2 is the value a shown in FIG. 3, in other words, the boundary point between the range which can be captured by the default position (F0) and the range which can be captured by the closer side (F−). When the size is larger than the set value 2, the processing advances to the next step S314 and when the size is the set value 2 or smaller, the processing advances to step S304.

In step S314, the focus lens 11b is moved to the closer side (F−).

Next, in step S315 shown in FIG. 8, it is judged whether or not the estimated size (calculated by the distance between the portions showing the coordinate position) is smaller than a set value 3. The set value 3 is the value b shown in FIG. 3, in other words, the boundary point between the range which can be captured by the default position (F0) and the range which can be captured by the farther side (F+). When the estimated size is smaller than the set value 3, the processing advances to the next step S316 and when the estimated size is the set value 3 or larger, the processing advances to step S317.

In step S316, the focus lens 11b is moved to the farther side (F+).

In step S317, it is judged whether or not the estimated size is larger than the set value 4. The set value 4 is the value a shown in FIG. 3, in other words, the boundary point between the range which can be captured by the default position (F0) and the range which can be captured by the closer side (F−).

When the estimated size is larger than the set value 4, the processing advances to the next step S318 and when the estimated size is the set value 4 or smaller, the processing advances to step S304.

In step S318, the focus lens 11b is moved to the closer side (F−).

As described above, in the second embodiment, it is judged whether or not the symbol size can be estimated based on the eye portion (portion showing the coordinate position) of the two dimensional code, and when the symbol size can be estimated, the position of the focus lens 11b is adjusted based on the symbol size and the image is analyzed to perform decoding processing.

With this, even if the decoding of the two dimensional code fails, if the estimate of the symbol size was possible, the image can be analyzed and the decoding processing can be performed without capturing the two dimensional code again. Consequently, unnecessary capturing movement can be omitted.

The present embodiment is specifically described above, however, the present embodiment is not limited to the above embodiment and modifications can be made without leaving the scope of the embodiment.

For example, the above described embodiment describes processing when a two dimensional code is captured as a symbol, however similar processing can be performed when a one dimensional barcode is captured.

Also, in the above described embodiment, "far" is defined as a distance of 15 cm from the imaging section 10, "focus position" is defined as a distance of 10 cm from the imaging section 10 and "close" is defined as a distance of 5 cm from the imaging section 10, however, the distance is not limited to this, and any setting is possible according to the specifications of the imaging section 10.

Also, in the above described embodiment, two different values are used as a set value when judging the approximate size of the symbol, however, one set value can be used. When one set value is used, the focus position of the focus lens 11b is moved to a predetermined position of the farther side when the size of the symbol is smaller than the set value and the focus position of the focus lens 11b is moved to a predetermined position of the closer side when the size of the symbol is larger than the set value.

The detailed configuration and the detailed operation of each device composing the symbol reading device 1 can be suitably modified without leaving the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A symbol reading device comprising:
   an imaging section to capture a symbol and generate a captured image;
   a detecting section to detect a size of the symbol from the captured image generated by the imaging section;
   a judging section to judge between large and small by comparing the size of the symbol detected by the detecting section to a pre-set value;
   a focus movement controlling section to move a focus position of the imaging section to (i) a predetermined position of a farther side when the size of the symbol is smaller than the pre-set value as a result of the judgment by the judging section, and (ii) a predetermined position of a closer side when the size of the symbol is larger than the pre-set value as a result of the judgment by the judging section; and an analyzing section to analyze symbol data corresponding to the symbol from the captured image generated by the imaging section at the focus position moved to by the focus movement controlling section;

wherein the detecting section detects the size of the symbol based on a portion showing a coordinate position, the portion being included in the captured image.

2. The symbol reading device according to claim 1, wherein:

the pre-set value is at least two different values; and the focus movement controlling section moves the focus position of the imaging section to the predetermined position of the farther side when the size of the symbol is smaller than a smaller value of the two different values as a result of the judgment by the judging section, and moves the focus position of the imaging section to the predetermined position of the closer side when the size of the symbol is larger than a larger value of the two different values as a result of the judgment by the judging section.

3. The symbol reading device according to claim 1, wherein the symbol is one of a one dimensional barcode and a two dimensional code.

4. A non-transitory computer readable recording medium having a program stored thereon which is readable by a computer of a symbol reading device, wherein the program controls the computer to perform functions comprising:

detecting a size of a symbol from a captured image generated by an imaging section;

judging between large and small by comparing the detected size of the symbol to a pre-set value;

controlling to move a focus position of the imaging section to (i) a predetermined position of a farther side when the size of the symbol is smaller than the pre-set value as a result of the judgment, and (ii) a predetermined position of a closer side when the size of the symbol is larger than the pre-set value as a result of the judgment; and analyzing symbol data corresponding to the symbol from the captured image generated by the imaging section at the focus position moved to by the controlling;

wherein the size of the symbol is detected based on a portion showing a coordinate position, the portion being included in the captured image.

5. A symbol reading method performed by a computer of a symbol reading device, the method comprising:

detecting a size of a symbol from a captured image generated by an imaging section;

judging between large and small by comparing the detected size of the symbol to a pre-set value;

controlling to move a focus position of the imaging section to (i) a predetermined position of a farther side when the size of the symbol is smaller than the pre-set value as a result of the judgment, and (ii) a predetermined position of a closer side when the size of the symbol is larger than the pre-set value as a result of the judgment; and analyzing symbol data corresponding to the symbol from the captured image generated by the imaging section at a focus position moved to by the controlling;

wherein the size of the symbol is detected based on a portion showing a coordinate position, the portion being included in the captured image.

6. The symbol reading method according to claim 5, wherein:

the pre-set value is at least two different values; and movement is controlled to move the focus position of the imaging section to the predetermined position of the farther side when the size of the symbol is smaller than a smaller value of the two different values as a result of the judgment, and to move the focus position of the imaging section to the predetermined position of the closer side when the size of the symbol is larger than a larger value of the two different values as a result of the judgment.

7. The symbol reading method according to claim 5, wherein the symbol is one of a one dimensional barcode and a two dimensional code.

* * * * *